(12) United States Patent
Salah et al.

(10) Patent No.: US 11,528,089 B2
(45) Date of Patent: Dec. 13, 2022

(54) METHOD AND APPARATUS FOR DETERMINING PDCCH MONITORING CAPABILITY IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 24 days.

(21) Appl. No.: 17/088,837

(22) Filed: Nov. 4, 2020

(65) Prior Publication Data

US 2021/0160002 A1 May 27, 2021

Related U.S. Application Data

(60) Provisional application No. 62/938,356, filed on Nov. 21, 2019.

(51) Int. Cl.
*H04L 1/00* (2006.01)
*H04W 72/04* (2009.01)
*H04L 5/00* (2006.01)

(52) U.S. Cl.
CPC ............ *H04L 1/0038* (2013.01); *H04L 5/001* (2013.01); *H04W 72/042* (2013.01); *H04W 72/048* (2013.01)

(58) Field of Classification Search
CPC ..... H04L 1/0038; H04L 5/001; H04L 5/0053; H04L 1/0039; H04W 72/042; H04W 72/048
See application file for complete search history.

(56) References Cited

U.S. PATENT DOCUMENTS

| 2017/0280447 | A1* | 9/2017 | Uchino | H04W 28/02 |
| 2020/0329389 | A1* | 10/2020 | Hosseini | H04L 5/0053 |
| 2021/0037607 | A1* | 2/2021 | Hamidi-Sepehr | H04L 5/001 |
| 2021/0105763 | A1* | 4/2021 | Takeda | H04L 1/1896 |
| 2021/0112432 | A1* | 4/2021 | Yang | H04W 72/042 |
| 2021/0112572 | A1* | 4/2021 | Saber | H04W 72/1242 |
| 2021/0144687 | A1* | 5/2021 | Hosseini | H04L 1/0038 |
| 2021/0153177 | A1* | 5/2021 | Hosseini | H04L 1/0045 |
| 2021/0195450 | A1* | 6/2021 | Lindoff | H04W 72/042 |
| 2021/0314993 | A1* | 10/2021 | Takeda | H04W 72/1289 |

* cited by examiner

*Primary Examiner* — Ayaz R Sheikh
*Assistant Examiner* — Tarell A Hampton
(74) *Attorney, Agent, or Firm* — Han IP PLLC; Andy M. Han

(57) ABSTRACT

Various solutions for PDCCH monitoring capability determination in CA scenario with respect to user equipment and network apparatus in mobile communications are described. An apparatus may receive a configuration configuring a first set of cells using a first PDCCH monitoring capability and a second set of cells using a second PDCCH monitoring capability. The apparatus may determine a first monitoring budget corresponding to the first set of cells based on the first PDCCH monitoring capability and a second monitoring budget corresponding to the second set of cells based on the second PDCCH monitoring capability. The apparatus may perform a PDCCH monitoring according to the first monitoring budget and the second monitoring budget.

16 Claims, 5 Drawing Sheets

METHOD AND APPARATUS FOR DETERMINING PDCCH MONITORING CAPABILITY IN MOBILE COMMUNICATIONS

CROSS REFERENCE TO RELATED PATENT APPLICATION(S)

The present disclosure is part of a non-provisional patent application claiming the priority benefit of U.S. Provisional Patent Application No. 62/938,356, filed on 21 Nov. 2019, the content of which being incorporated by reference in its entirety.

TECHNICAL FIELD

The present disclosure is generally related to mobile communications and, more particularly, to physical downlink control channel (PDCCH) monitoring capability determination in carrier aggregation (CA) scenario with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), PDCCH candidates refers to the area in the downlink resource grid where PDCCH may be carried. The UE needs to perform blind decoding throughout these PDCCH candidates trying to find PDCCH data (e.g., downlink control information (DCI)). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of control channel elements (CCEs) that require channel estimations. This limit the UE complexity to a reasonable level with an acceptable restriction on the search space sets for PDCCH monitoring.

In Release-15 (Rel-15) of the $3^{rd}$ Generation Partnership Project (3GPP) technical specification for NR, the limit on the maximum number of PDCCH candidates to monitor in CA scenarios is defined per slot. The maximum number of non-overlapped CCEs or blind decodings (BDs) is specified per slot. In Release-16 (Rel-16) of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

However, in Rel-16, the PDCCH monitoring capability in CA scenarios is yet to be defined, specifically if the UE indicated carrier aggregation with more than 4 serving cells and the UE is configured with a number of cells larger than the reported maximum monitoring cells. In Rel-15, the limit on the maximum number of PDCCH candidates to monitor in CA scenarios is defined per slot. In Rel-16, the span-based PDCCH monitoring capability is introduced and the co-existence between the Rel-16 CCEs/BDs budgets defined per span and the Rel-15 slot-based budgets is supported. Therefore, the Rel-15 slot-based budget calculation needs some modification for Rel-16 CA scenarios. There is a need to design and specify the span-based budget calculation for CA scenarios in Rel-16.

Accordingly, how to determine the PDCCH monitoring capability in CA scenarios for the co-existence between the Rel-16 span-based configuration and the Rel-15 slot-based configuration becomes an important issue for the newly developed wireless communication network. Therefore, there is a need to provide proper PDCCH monitoring schemes for CA scenarios in Rel-16.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PDCCH monitoring capability determination in CA scenario with respect to user equipment and network apparatus in mobile communications.

In one aspect, a method may involve an apparatus transmitting a capability report to indicate a first PDCCH monitoring capability and a second PDCCH monitoring capability. The method may also involve the apparatus receiving a configuration configuring a first set of cells using the first PDCCH monitoring capability and a second set of cells using the second PDCCH monitoring capability. The method may further involve the apparatus determining a first monitoring budget corresponding to the first set of cells based on the first PDCCH monitoring capability and a second monitoring budget corresponding to the second set of cells based on the second PDCCH monitoring capability. The method may further involve the apparatus performing a PDCCH monitoring according to the first monitoring budget and the second monitoring budget.

In one aspect, an apparatus may comprise a transceiver which, during operation, wirelessly communicates with network nodes of a wireless network. The apparatus may also comprise a processor communicatively coupled to the transceiver. The processor, during operation, may perform operations comprising transmitting, via the transceiver, a capability report to indicate a first PDCCH monitoring capability and a second PDCCH monitoring capability. The processor may also perform operations comprising receiving, via the transceiver, a configuration configuring a first set of cells using the first PDCCH monitoring capability and a second set of cells using the second PDCCH monitoring capability. The processor may further perform operations comprising determining a first monitoring budget corresponding to the first set of cells based on the first PDCCH monitoring capability and a second monitoring budget corresponding to the second set of cells based on the second PDCCH monitoring capability. The processor may further perform operations comprising performing a PDCCH monitoring according to the first monitoring budget and the second monitoring budget.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PDCCH monitoring capability determination in CA scenario with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, PDCCH candidates refers to the area in the downlink resource grid where PDCCH may be carried. The UE needs to perform blind decoding throughout these PDCCH candidates trying to find PDCCH data (e.g., DCI). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of CCEs that require channel estimations. This limit the UE complexity to a reasonable level with an acceptable restriction on the search space sets for PDCCH monitoring.

In Rel-15 of the 3GPP technical specification for NR, the limit on the maximum number of PDCCH candidates to monitor in CA scenarios is defined per slot. The maximum number of non-overlapped CCEs or BDs is specified per slot. In Rel-16 of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

Figure 1:
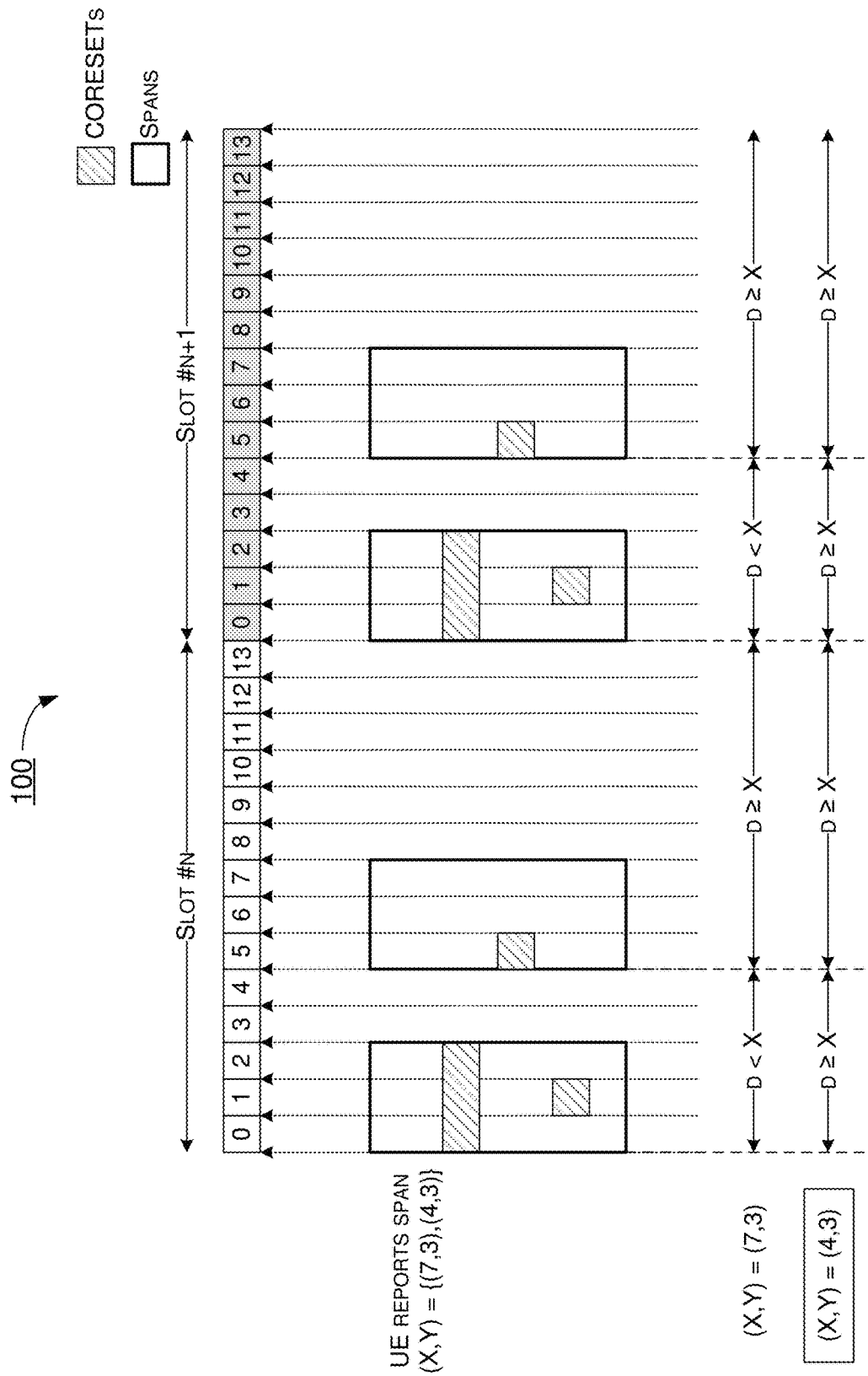
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network, an NB-IoT network or an IIoT network). The span-based monitoring is used in Rel-16 for the explicit BDs/CCEs budgets. The UE reports one or more combinations of (X, Y) number of symbols, where X≥Y, for PDCCH monitoring. A span is a set of consecutive symbols in a slot in which the UE is configured to monitor PDCCH candidates. The UE supports PDCCH monitoring occasions in any symbol of a slot with minimum time separation of X symbols between the first symbol of two consecutive spans, including across slots. The duration of a span is $d_{span}$=max $(d_{CORESET,max}, Y_{min})$, where $d_{CORESET,max}$ is a maximum duration among durations of CORESETs that are configured to the UE and $Y_{min}$ is a minimum value of Y in the combinations of (X, Y) that are reported by the UE. A last span in a slot can have a shorter duration than other spans in the slot. A UE capability for PDCCH monitoring per slot or per span on an active downlink (DL) bandwidth part (BWP) of a serving cell is defined by a maximum number of PDCCH candidates and non-overlapped CCEs the UE can monitor per slot or per span, respectively, on the active DL BWP of the serving cell.

Scenario 100 illustrates an example of span determination. The UE may report the spans it can support. For example, the UE may report the supported span (X, Y)={(7,3), (4,3)} to the network node. The network node may select at least one of them and configure the selected span to the UE. A particular PDCCH monitoring configuration that meets the UE capability limitation may be configured if the span arrangement satisfies the gap separation for at least one (X, Y) in the UE reported candidate value set in every slot, including cross slot boundary. For example, the network node may determine that span duration=max{maximum value of all CORESET durations, min of Y}=max{3,3}=3. The span arrangement does not satisfy the gap separation for (X, Y)=(7,3) and can satisfy the gap separation for (X, Y)=(4,3). Therefore, the PDCCH monitoring configuration corresponding to monitoring span (X, Y)=(4,3) can be configured to the UE by the network node.

Figure 2:
FIG. 2 is a diagram depicting an example table of CCEs and BDs budgets under schemes in accordance with implementations of the present disclosure.

In Rel-15, the maximum number of non-overlapped CCEs and the maximum number of monitored PDCCH candidates (e.g., the maximum number of BDs) are specified per slot for different sub-carrier spacing (SCS) (e.g., $\mu$=0, 1, 2 or 3). In Rel-16, the maximum number of non-overlapped CCEs and the maximum number of monitored PDCCH candidates (e.g., the maximum number of BDs) are specified per span for combinations of (X, Y) and different SCS (e.g., μ=0 or 1). FIG. 2 illustrates an example table 200 under schemes in accordance with implementations of the present disclosure. Table 200 illustrates the CCEs budgets and BDs budgets corresponding to the Rel-15 slot-based configuration and the Rel-16 span-based configuration respectively. 3 monitoring spans are introduced in Rel-16 including (2, 2), (4, 3) and (7, 3). The UE may be configured to determine the CCEs budgets and BDs budgets according to table 200 which is also defined in the 3GPP technical specification for NR.

Figure 3:
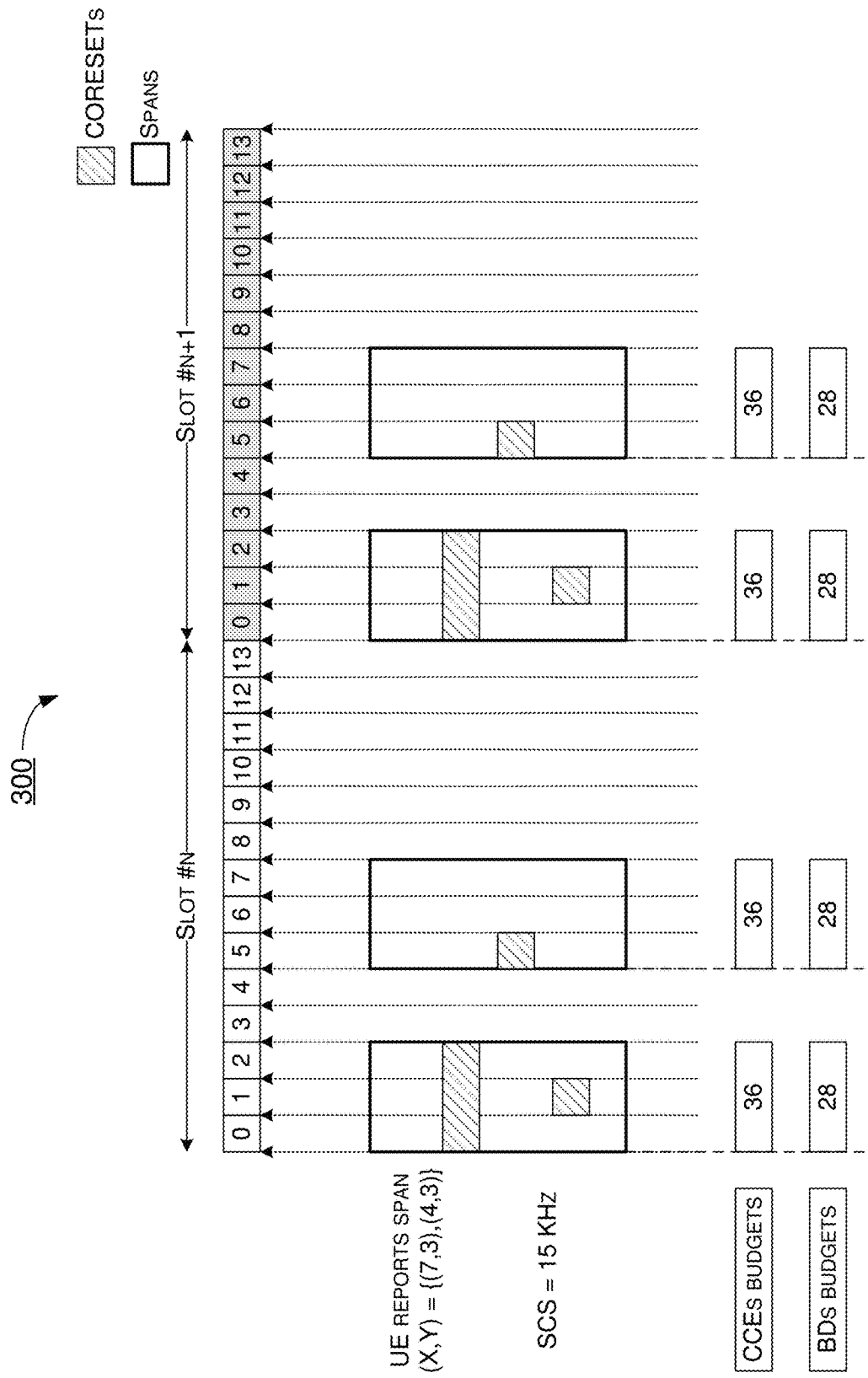
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a plurality of network nodes, which may be a part of a wireless communication network (e.g., an LTE network, a 5G network, an NR network, an IoT network, an NB-IoT network or an IIoT network). Scenario 300 illustrates an example of CCEs/BDs budgets determination. The CCEs/BDs budgets are defined per span in Rel-16 for SCS=15 KHz (e.g., μ=0) and 30 KHz (e.g., μ=1). Assuming that the PDCCH monitoring configuration corresponding to monitoring span (X,Y)=(4,3) is configured and the SCS is 15 KHz, the UE may be configured to determine the CCEs/BDs budgets according to table 200 defined in 3GPP technical specification for NR. As shown in FIG. 3, for (X,Y)=(4,3) and SCS=15 KHz, the UE may determine that the CCE budgets is equal to 36 and the BDs budgets is equal to 28 for each span.

However, in Rel-16, the PDCCH monitoring capability in CA scenarios is yet to be defined, specifically if the UE indicated carrier aggregation with more than 4 serving cells and the UE is configured with a number of cells larger than the reported maximum monitoring cells. In Rel-15, the limit on the maximum number of PDCCH candidates to monitor in CA scenarios is defined per slot. In Rel-16, the span-based PDCCH monitoring capability is introduced and the co-existence between the Rel-16 CCEs/BDs budgets defined per span and the Rel-15 slot-based budgets is supported. Therefore, the Rel-15 slot-based budget calculation needs some modification for Rel-16 CA scenarios. There is a need to design and specify the span-based budget calculation for CA scenarios in Rel-16.

In view of the above, the present disclosure proposes a number of schemes pertaining to PDCCH monitoring capability determination in CA scenario with respect to the UE and the network apparatus. According to the schemes of the present disclosure, the UE may support both Rel-15 slot-based and Rel-16 span-based PDCCH monitoring for CA scenario. The numbers of Rel-15 CCEs/BDs budgets and Rel-16 CCEs/BDs budgets may be determined separately and independently. UE can report multiple combinations of the number of carriers it can support with Rel-15 and Rel-16. Then, some carriers with Rel-15 slot-based and some other carriers with Rel-16 span-based may be configured independently. The UE may determine Rel-15 CCEs/BDs budgets for the Rel-15 slot-based carriers according to slot-based parameters and formulas and determine Rel-16 CCEs/BDs budgets for the Rel-15 slot-based carriers according to span-based parameters and formulas. Accordingly, PDCCH monitoring capability can be properly specified/determined for CA scenarios under the co-existence between the Rel-16 span-based PDCCH monitoring and the Rel-15 slot-based PDCCH monitoring. The network nodes and the UE can configure and monitor PDCCH correctly/properly under the newly introduced Rel-16 span-based PDCCH configurations.

Specifically, in a case that the Rel-16 PDCCH per-san monitoring capability is supported per scheduling component carrier (CC). The UE may be configured to transmit a capability report to indicate a first PDCCH monitoring capability and a second PDCCH monitoring capability. The first PDCCH monitoring capability may comprise a slot-based PDCCH monitoring capability (e.g., Rel-15 PDCCH monitoring capability). The second PDCCH monitoring capability may comprise a span-based PDCCH monitoring capability (e.g., Rel-16 PDCCH monitoring capability). The capability report may comprise a plurality of combinations of the first PDCCH monitoring capability and the second PDCCH monitoring capability. For example, the UE may report the support of CA with a certain number of carriers. A plurality of combinations (e.g., multiple candidates) may be reported to the network node. The UE may report that it can support a first combination of 4 Rel-16 CCs and 1 Rel-15 CCs, a second combination of 3 Rel-16 CCs and 2 Rel-15 CCs, and a third combination of 1 Rel-16 CCs and 4 Rel-15 CCs.

The network node may choose one of the combinations supported by the UE to configure the UE. The UE may receive a configuration configuring a first set of cells/CCs using the first PDCCH monitoring capability and a second set of cells/CCs using the second PDCCH monitoring capability. The configuration may comprise a certain number of Rel-15 CCs and a certain number of Rel-16 CCs that needs to be monitored by the UE. Thus, the UE can be configured with the Rel-16 per-span monitoring for some CCs (e.g., 3 Rel-16 CCs) and with the Rel-15 per-slot monitoring for some other CCs (e.g., 2 Rel-15 CCs). The Rel-16 CCs may be used for ultra-reliable low-latency communication (URLLC) services. The Rel-15 CCs may be used for enhanced mobile broadband (eMBB) services.

Then, the UE may be configured to determine a first monitoring budget corresponding to the first set of cells based on the first PDCCH monitoring capability and a second monitoring budget corresponding to the second set of cells based on the second PDCCH monitoring capability. The first monitoring budget may comprise a first CCE or BD budget. The second monitoring budget may comprise a second CCE or BD budget. The UE may perform the PDCCH monitoring according to the first monitoring budget and the second monitoring budget respectively.

In Rel-15, $N_{cells}^{DL}$ denotes the number of configured DL serving cells. $N_{cells}^{cap}$ is used in Rel-15 and denotes the number of cells on which the UE is capable to monitor PDCCH. In an event that $N_{cells}^{DL} \leq 4$, then $N_{cells}^{cap} = N_{cells}^{DL}$. In an event that $N_{cells}^{DL} > 4$, then $N_{cells}^{cap}$=pdcch-BlindDetectionCA (if reported by the UE), else $N_{cells}^{cap} = N_{cells}^{DL}$. The parameter pdcch-BlindDetectionCA should be verified by the condition $4 \leq$ pdcch-BlindDetectionCA $\leq N_{cells}^{DL}$. Hence 4 is the minimum value of pdcch-BlindDetectionCA. The parameter pdcch-BlindDetectionCA indicates PDCCH blind decoding capabilities supported by the UE for CA with more than 4 CCs. The field value is from 4 to 16. For example, the UE may be configured with 7 cells and reports BlindDetectionCA=5, hence $N_{cells}^{DL}=7$ and $N_{cells}^{cap}=5$.

In Rel-16, $N_{cells}^{DL}$ also denotes the number of configured DL serving cells. $N_{cells}^{cap-r16}$ is used in Rel-16 and denotes the number of cells on which the UE is capable to monitor PDCCH. It is used to replace $N_{cells}^{cap}$. Thus, $N_{cells}^{cap-r16} = N_{cells,r15}^{cap-r16} + N_{cells,r16}^{cap-r16}$, $N_{cells,r15}^{cap-r16}$ in Rel-16 is the number of DL cells supporting the Rel-15 per slot monitoring for the CCEs/BDs budget. $N_{cells,r16}^{cap-r16}$ in Rel-16 is the number of DL cells supporting the Rel-16 per span monitoring for the CCEs/BDs budget. The Rel-15 parameter pdcch-BlindDetectionCA is replaced in Rel-16 by two new parameters pdcch-BlindDetectionCA-r15 and pdcch-BlindDetectionCA-r16. In Rel-16 the UE reports combinations of pdcch-BlindDetectionCA-r15 and pdcch-BlindDetectionCA-r16 for CA. The minimum value of pdcch-BlindDetectionCA-R15 is 1 and the minimum value of pdcch-BlindDetectionCA-R16 is 1. The candidate values for pdcch-BlindDetectionCA-R15 is 1 to 15. The candidate values for pdcch-BlindDetectionCA-R16 is 1 to 15. The range of reported number should be 3 pdcch-BlindDetectionCA-R15+pdcch-BlindDetectionCA-R16≤16. For example, the UE may be configured with 7 cells and may report (pdcch-BlindDetectionCA-r15, pdcch-BlindDetectionCA-r16)=(3,2). Thus, $N_{cells,r15}^{cap-r16}=3$ and $N_{cells,r16}^{cap-r16}=2$.

In some implementations, in an event that a UE indicates in UE-NR-Capability-r15 or in UE-NR-Capability-r16 a carrier aggregation capability larger than Y downlink cells or larger than Z downlink cells, respectively, the UE includes in UE-NR-Capability-r15 or in UE-NR-Capability-r16 an indication for a maximum number of PDCCH candidates and a maximum number of non-overlapped CCEs the UE can monitor for downlink cells with PDCCH MonitoringCapabilityConfig=R15 PDCCH monitoring capability or for downlink cells with PDCCH MonitoringCapabilityConfig=R16 PDCCH monitoring capability when the UE is configured for carrier aggregation operation over more than Y downlink cells or over more than Z downlink cells, respectively, and with at least one downlink cells from the Y downlink cells and at least one downlink cell from the Z downlink cells. When a UE is not configured for NR-dual connectivity (NR-DC) operation, the UE determines a capability to monitor a maximum number of PDCCH candidates and a maximum number of non-overlapped CCEs per slot or per span that corresponds to $N_{cells,r15}^{cap-r16}$ downlink cells or to $N_{cells,r16}^{cap-r16}$ downlink cells, respectively. $N_{cells,r15}^{cap-r16}$ is the number of configured downlink cells if the UE does not provide pdcch-BlindDetectionCA-r15. Otherwise, $N_{cells,r15}^{cap-r16}$ is the value of pdcch-BlindDetectionCA-r15. $N_{cells,r16}^{cap-r16}$ is the number of configured downlink cells if the UE does not provide pdcch-BlindDetectionCA-r16. Otherwise, $N_{cells,r16}^{cap-r16}$ is the value of pdcch-BlindDetectionCA-r16.

In some implementations, in an event that a UE is configured with $N_{cells,0}^{DL,\mu}+N_{cells,1}^{DL,\mu}$ downlink cells using Rel-15 PDCCH monitoring capability and with associated PDCCH candidates monitored in the active DL BWPs of the scheduling cell(s) using SCS configuration μ, where $\Sigma_{\mu=0}^{3}(N_{cells,0}^{DL,\mu}+\gamma\cdot N_{cells,1}^{DL,\mu})>N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu}=\lfloor N_{cells}^{cap}\cdot M_{PDCCH}^{max,slot,\mu}\cdot (N_{cells,0}^{DL,\mu}+\gamma\cdot N_{cells,1}^{DL,\mu})/\Sigma_{j=0}^{3}(N_{cells,0}^{DL,j}+\gamma\cdot N_{cells,1}^{DL,j})\rfloor$ PDCCH candidates or more than $C_{PDCCH}^{total,slot,\mu}=\lfloor N_{cells}^{cap}\cdot C_{PDCCH}^{max,slot,\mu}\cdot (N_{cells,0}^{DL,\mu}+\gamma\cdot N_{cells,1}^{DL,\mu})/\Sigma_{j=0}^{3}(N_{cells,0}^{DL,j}+\gamma\cdot N_{cells,1}^{DL,j})\rfloor$ non-overlapped CCEs per slot on the active DL BWP(s) of scheduling cell(s) from the $N_{cells,0}^{DL}+N_{cells,1}^{DL}$ downlink cells. In an event that a UE is configured with downlink cells using both Rel-15 PDCCH monitoring capability and Rel-16 PDCCH monitoring capability, $N_{cells}^{cap}$ is replaced by $N_{cells,r15}^{cap-r16}$. Thus, the UE may determine the first monitoring budget (e.g., $M_{PDCCH}^{total,slot,\mu}$ or $C_{PDCCH}^{total,slot,\mu}$) by replacing a PDCCH blind decoding capability (e.g, $N_{cells}^{cap}$) with a Rel-15 PDCCH blind decoding capability (e.g., $N_{cells,r15}^{cap-r16}$).

In some implementations, in an event that a UE is configured only with $N_{cells,r16}^{DL,\mu}$ downlink cells using Rel-16 PDCCH monitoring capability, and with $N_{cells,r16}^{DL,(X,Y),\mu}$ of the $N_{cells,r16}^{DL,\mu}$ downlink cells using combination (X, Y) for PDCCH monitoring, and having active DL BWPs using SCS configuration μ, where $\Sigma_{\mu=0}^{1}N_{cells,r16}^{DL,\mu}>N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu}=\lfloor N_{cells}^{cap-r16}\cdot M_{PDCCH}^{max,(X,Y),\mu}\cdot N_{cells,r16}^{DL,(X,Y),\mu}/\Sigma_{j=0}^{1}N_{cells,r16}^{DL,j}\rfloor$ PDCCH candidates or more than $C_{PDCCH}^{total,(X,Y),\mu}=\lfloor N_{cells}^{cap-r16}\cdot C_{PDCCH}^{max,(X,Y),\mu}\cdot N_{cells,r16}^{DL,(X,Y),\mu}/\Sigma_{j=0}^{1}N_{cells,r16}^{DL,j}\rfloor$ non-overlapped CCEs per span on the active DL BWP(s) of scheduling cell(s) from the $N_{cells,r16}^{DL,(X,Y),\mu}$ downlink cells if the spans on all scheduling cells from the $N_{cells,r16}^{DL,(X,Y),\mu}$ downlink cells are aligned, where $N_{cells,r16}^{DL,j}$ is a number of configured cells using Rel-16 PDCCH monitoring capability with SCS configuration j. In an event that a UE is configured with downlink cells using both Rel-15 PDCCH monitoring capability and Rel-16 PDCCH monitoring capability, $N_{cells}^{cap-r16}$ is replaced by $N_{cells,r16}^{cap-r16}$. Thus, the UE may determine the second monitoring budget (e.g., $M_{PDCCH}^{total,(X,Y),\mu}$ or $C_{PDCCH}^{total,(X,Y),\mu}$) by replacing a PDCCH blind decoding capability (e.g, $N_{cells}^{cap-r16}$) with a Rel-16 PDCCH blind decoding capability (e.g., $N_{cells,r16}^{cap-r16}$).

In some implementations, after determining the CCEs/BDs budgets for the supported number of Rel-15 CCs, the determined CCEs/BDs budgets should be shared across all Rel-15 CCs. The UE may be configured to split the first monitoring budget between the first number of cells or CCs using the first PDCCH monitoring capability. The CCEs/BDs budget of PDCCH monitoring for the CCs configured with the Rel-15 PDCCH monitoring should be calculated using the Rel-15 formulas for these specific CCs. Similarly, after determining the CCEs/BDs budgets for the supported number of Rel-16 CCs, the determined CCEs/BDs budgets should be shared across all Rel-16 CCs. The UE may be configured to split the second monitoring budget between the second number of cells or CCs using the first PDCCH monitoring capability. In Rel-16, the calculation of the number of CCEs (e.g., $C_{PDCCH}^{total,slot,\mu}$) and the number of PDCCH candidates (e.g., $M_{PDCCH}^{total,slot,\mu}$) to monitor is also defined separately for Rel-15 CC and Rel-16 CCs. Thus, there is a budget for Rel-15 CCs and another budget for Rel-16 CCs. The Rel-15 CCs will continue to use the legacy Rel-15 formulas and the Rel-16 carriers will use the newly defined formulas.

In some implementations, for a group of cells having the same numerology and the same monitoring span (X, Y), a formula for the CCEs/BDs budget per span may be applied for the sub-group of carriers having aligned spans (e.g., non-staggered spans). The aligned spans comprises the CCs sharing the same span. In an event that the spans are staggered, then group of aligned spans may be defined and aligned spans may be calculated together. The UE may be configured to determine the second monitoring budget (e.g., Rel-16 CCEs/BDs budget) corresponding to the second set of cells (e.g., Rel-16 CCs) based on a same formula in an event that spans on the second set of cells are aligned. The UE may be configured to determine the second monitoring budget (e.g., Rel-16 CCEs/BDs budget) corresponding to the second set of cells (e.g., Rel-16 CCs) based on different formulas in an event that spans on the second set of cells are not aligned.

For example, in an event that 3 cells are configured with monitoring span (X,Y)=(7,3) and 2 cells are configured with monitoring span (X,Y)=(4,3), the CCEs/BDs budget corresponding to these two different monitoring spans are calculated independently since the parameters $N_{3cells}^{DL,(7,3)}$ and $N_{2cells}^{DL,(4,3)}$ are different and defined per span. Thus, the UE may distinguish aligned spans CCs from non-aligned spans CCs and apply different formula for CCEs/BDs budget determination on the aligned span CCs. In another implementation, aligned spans (e.g., non-staggered spans) are not allowed. The CCs with same numerology configured with the same span configuration may be configured with aligned spans.

Illustrative Implementations

Figure 4:
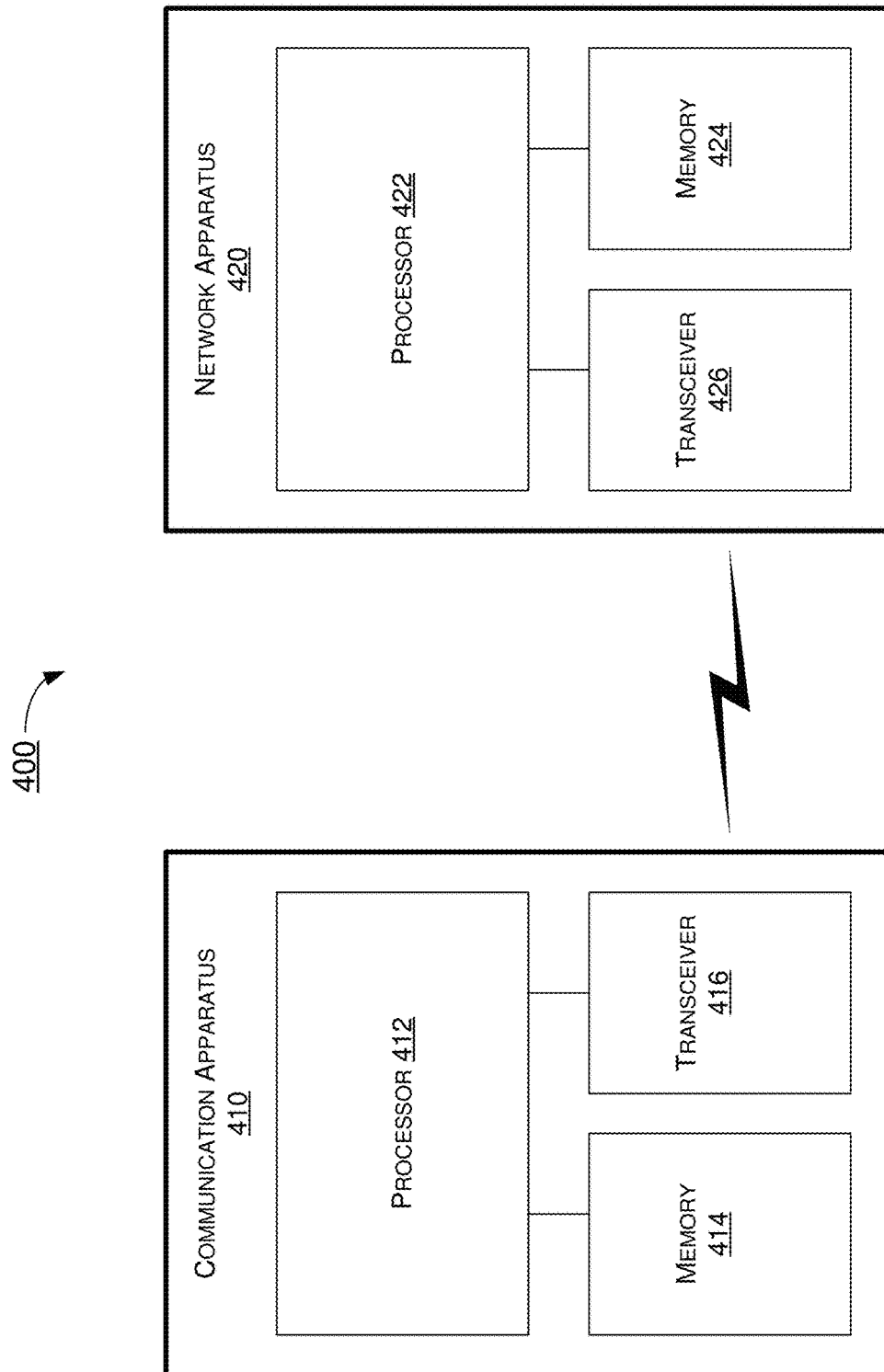
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to PDCCH monitoring capability determination in CA scenario with respect to user equipment and network apparatus in wireless communications, including scenarios/schemes described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may be configured to transmit, via transceiver 416, a capability report to indicate a first PDCCH monitoring capability and a second PDCCH monitoring capability. Processor 412 may report a slot-based PDCCH monitoring capability (e.g., Rel-15 PDCCH monitoring capability). Processor 412 may also report a span-based PDCCH monitoring capability (e.g., Rel-16 PDCCH monitoring capability). Processor 412 may report a plurality of combinations of the first PDCCH monitoring capability and the second PDCCH monitoring capability. For example, processor 412 may report the support of CA with a certain number of carriers. Processor 412 may report a plurality of combinations (e.g., multiple candidates) network apparatus 420. Processor 412 may report that it can support a first combination of 4 Rel-16 CCs and 1 Rel-15 CCs, a second combination of 3 Rel-16 CCs and 2 Rel-15 CCs, and a third combination of 1 Rel-16 CCs and 4 Rel-15 CCs.

In some implementations, network apparatus 420 may choose one of the combinations supported by communication apparatus 410 to configure communication apparatus 410. Processor 412 may receive, via transceiver 416, a configuration configuring a first set of cells/CCs using the first PDCCH monitoring capability and a second set of cells/CCs using the second PDCCH monitoring capability. Network apparatus 420 may configure a certain number of Rel-15 CCs and a certain number of Rel-16 CCs that needs to be monitored by communication apparatus 410. Thus, processor 412 can be configured with the Rel-16 per-span monitoring for some CCs (e.g., 3 Rel-16 CCs) and with the Rel-15 per-slot monitoring for some other CCs (e.g., 2 Rel-15 CCs). Network apparatus 420 may configure the Rel-16 CCs for URLLC services. Network apparatus 420 may configure the Rel-15 CCs for eMBB services.

In some implementations, processor 412 may be configured to determine a first monitoring budget corresponding to the first set of cells based on the first PDCCH monitoring capability and a second monitoring budget corresponding to the second set of cells based on the second PDCCH monitoring capability. Processor 412 may determine a first CCE or BD budget. Processor 412 a second CCE or BD budget. Processor 412 may perform the PDCCH monitoring according to the first monitoring budget and the second monitoring budget respectively.

In some implementations, processor 412 may be configured to split the first monitoring budget between the first number of cells or CCs using the first PDCCH monitoring capability. Processor 412 may calculate the CCEs/BDs budget of PDCCH monitoring for the CCs configured with the Rel-15 PDCCH monitoring by using the Rel-15 formulas for these specific CCs. Similarly, processor 412 may be configured to split the second monitoring budget between the second number of cells or CCs using the first PDCCH monitoring capability. In Rel-16, processor 412 may calculate the number of CCEs (e.g., $C_{PDCCH}^{total,slot,\mu}$) and the number of PDCCH candidates (e.g., $M_{PDCCH}^{total,slot,\mu}$) separately for Rel-15 CC and Rel-16 CCs. Thus, processor 412 may determine a budget for Rel-15 CCs and another budget for Rel-16 CCs. Processor 412 may use the legacy Rel-15 formulas for the Rel-15 CCs and use the newly defined formulas for the Rel-16 carriers.

In some implementations, for a group of cells having the same numerology and the same monitoring span (X, Y), processor 412 may apply a formula for the CCEs/BDs budget per span for the sub-group of carriers having aligned spans (e.g., non-staggered spans). In an event that the spans are staggered, processor 412 may determine a group of aligned spans and perform calculation together for the aligned spans. Processor 412 may be configured to determine the second monitoring budget (e.g., Rel-16 CCEs/BDs budget) corresponding to the second set of cells (e.g., Rel-16 CCs) based on a same formula in an event that spans on the second set of cells are aligned. Processor 412 may be configured to determine the second monitoring budget (e.g., Rel-16 CCEs/BDs budget) corresponding to the second set of cells (e.g., Rel-16 CCs) based on different formulas in an event that spans on the second set of cells are not aligned.

In some implementations, in an event that 3 cells are configured with monitoring span (X, Y)=(7,3) and 2 cells are configured with monitoring span (X, Y)=(4,3), processor 412 may calculate the CCEs/BDs budget corresponding to these two different monitoring spans independently since the parameters $N_{3cells}^{DL,(7,3)}$ and $N_{2cells}^{DL,(4,3)}$ are different and defined per span. Thus, processor 412 may distinguish aligned spans CCs from non-aligned spans CCs and apply different formula for CCEs/BDs budget determination on the aligned span CCs.

Illustrative Processes

Figure 5:
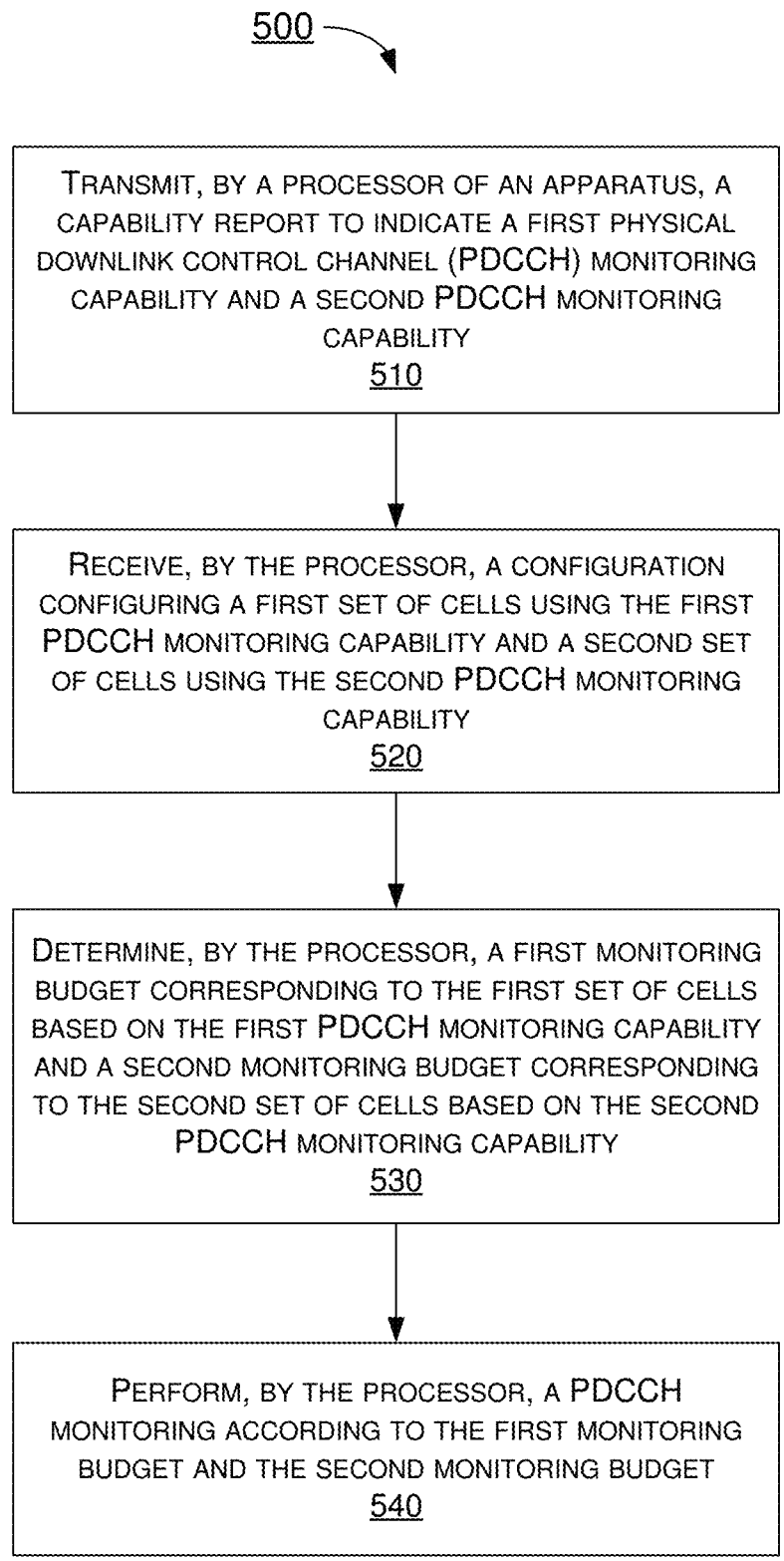
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to PDCCH monitoring capability determination in CA scenario with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 510. Process 500 may begin at block 510.

At 510, process 500 may involve processor 412 of apparatus 410 transmitting a capability report to indicate a first PDCCH monitoring capability and a second PDCCH monitoring capability. Process 500 may proceed from 510 to 520.

At 520, process 500 may involve processor 412 receiving a configuration configuring a first set of cells using the first PDCCH monitoring capability and a second set of cells using the second PDCCH monitoring capability. Process 500 may proceed from 520 to 530.

At 530, process 500 may involve processor 412 determining a first monitoring budget corresponding to the first set of cells based on the first PDCCH monitoring capability and a second monitoring budget corresponding to the second set of cells based on the second PDCCH monitoring capability. Process 500 may proceed from 530 to 540.

At 540, process 500 may involve processor 412 performing a PDCCH monitoring according to the first monitoring budget and the second monitoring budget.

In some implementations, the first PDCCH monitoring capability may comprise a slot-based PDCCH monitoring capability. The second PDCCH monitoring capability may comprise a span-based PDCCH monitoring capability.

In some implementations, the configuration may comprise a first number of cells or CCs using the first PDCCH monitoring capability and a second number of cells or CCs using the second PDCCH monitoring capability.

In some implementations, the first monitoring budget may comprise a first CCE or BD budget. The second monitoring budget may comprise a second CCE or BD budget.

In some implementations, the capability report may comprise a plurality of combinations of the first PDCCH monitoring capability and the second PDCCH monitoring capability.

In some implementations, process 500 may involve processor 412 determining the first monitoring budget by replacing a PDCCH blind decoding capability with a Release-15 PDCCH blind decoding capability.

In some implementations, process 500 may involve processor 412 determining comprises determining the second monitoring budget by replacing a PDCCH blind decoding capability with a Release-16 PDCCH blind decoding capability.

In some implementations, process 500 may involve processor 412 splitting the first monitoring budget between the first number of cells or CCs using the first PDCCH monitoring capability. Process 500 may also involve processor 412 splitting the second monitoring budget between the second number of cells or CCs using the first PDCCH monitoring capability.

In some implementations, process 500 may involve processor 412 determining the second monitoring budget corresponding to the second set of cells based on a same formula in an event that spans on the second set of cells are aligned.

In some implementations, process 500 may involve processor 412 determining the second monitoring budget corresponding to the second set of cells based on different formulas in an event that spans on the second set of cells are not aligned.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    transmitting, by a processor of an apparatus, a capability report to indicate a first physical downlink control channel (PDCCH) monitoring capability and a second PDCCH monitoring capability;
    receiving, by the processor, a configuration configuring a first set of cells using the first PDCCH monitoring capability and a second set of cells using the second PDCCH monitoring capability;
    determining, by the processor, a first monitoring budget corresponding to the first set of cells based on the first PDCCH monitoring capability and a second monitoring budget corresponding to the second set of cells based on the second PDCCH monitoring capability; and performing, by the processor, a PDCCH monitoring according to the first monitoring budget and the second monitoring budget, wherein the determining comprises determining the second monitoring budget corresponding to the second set of cells based on:
- a first formula in an event that spans on the second set of cells are aligned; or
- a second formula in an event that spans on the second set of cells are not aligned.

2. The method of claim 1, wherein the first PDCCH monitoring capability comprises a slot-based PDCCH monitoring capability, and wherein the second PDCCH monitoring capability comprises a span-based PDCCH monitoring capability.

3. The method of claim 1, wherein the configuration comprises a first number of cells or component carriers (CCs) using the first PDCCH monitoring capability and a second number of cells or CCs using the second PDCCH monitoring capability.

4. The method of claim 1, wherein the first monitoring budget comprises a first control channel element (CCE) or blind decoding (BD) budget, and wherein the second monitoring budget comprises a second CCE or BD budget.

5. The method of claim 1, wherein the capability report comprises a plurality of combinations of the first PDCCH monitoring capability and the second PDCCH monitoring capability.

6. The method of claim 1, wherein the determining comprises determining the first monitoring budget by replacing a PDCCH blind decoding capability with a Release-15 PDCCH blind decoding capability.

7. The method of claim 1, wherein the determining comprises determining the second monitoring budget by replacing a PDCCH blind decoding capability with a Release-16 PDCCH blind decoding capability.

8. The method of claim 3, further comprising:
splitting, by the processor, the first monitoring budget between the first number of cells or CCs using the first PDCCH monitoring capability; and
splitting, by the processor, the second monitoring budget between the second number of cells or CCs using the first PDCCH monitoring capability.

9. An apparatus, comprising:
a transceiver which, during operation, wirelessly communicates with network nodes of a wireless network; and
a processor communicatively coupled to the transceiver such that, during operation, the processor performs operations comprising:
transmitting, via the transceiver, a capability report to indicate a first physical downlink control channel (PDCCH) monitoring capability and a second PDCCH monitoring capability;
receiving, via the transceiver, a configuration configuring a first set of cells using the first PDCCH monitoring capability and a second set of cells using the second PDCCH monitoring capability;
determining a first monitoring budget corresponding to the first set of cells based on the first PDCCH monitoring capability and a second monitoring budget corresponding to the second set of cells based on the second PDCCH monitoring capability; and
performing a PDCCH monitoring according to the first monitoring budget and the second monitoring budget,
wherein, in determining the second monitoring budget corresponding to the second set of cells, the processor determines the second monitoring budget corresponding to the second set of cells based on:
- a first formula in an event that spans on the second set of cells are aligned; or
- a second formula in an event that spans on the second set of cells are not aligned.

10. The apparatus of claim 9, wherein the first PDCCH monitoring capability comprises a slot-based PDCCH monitoring capability, and wherein the second PDCCH monitoring capability comprises a span-based PDCCH monitoring capability.

11. The apparatus of claim 9, wherein the configuration comprises a first number of cells or component carriers (CCs) using the first PDCCH monitoring capability and a second number of cells or CCs using the second PDCCH monitoring capability.

12. The apparatus of claim 9, wherein the first monitoring budget comprises a first control channel element (CCE) or blind decoding (BD) budget, and wherein the second monitoring budget comprises a second CCE or BD budget.

13. The apparatus of claim 9, wherein the capability report comprises a plurality of combinations of the first PDCCH monitoring capability and the second PDCCH monitoring capability.

14. The apparatus of claim 9, wherein, in determining the first monitoring budget corresponding to the first set of cells, the processor determines the first monitoring budget by replacing a PDCCH blind decoding capability with a Release-15 PDCCH blind decoding capability.

15. The apparatus of claim 9, wherein, in determining the second monitoring budget corresponding to the second set of cells, the processor determines the second monitoring budget by replacing a PDCCH blind decoding capability with a Release-16 PDCCH blind decoding capability.

16. The apparatus of claim 11, wherein, during operation, the processor further performs operations comprising:
splitting the first monitoring budget between the first number of cells or CCs using the first PDCCH monitoring capability; and
splitting the second monitoring budget between the second number of cells or CCs using the first PDCCH monitoring capability.

* * * * *